(12) United States Patent
Lewis

(10) Patent No.: US 12,032,948 B2
(45) Date of Patent: Jul. 9, 2024

(54) SYSTEM AND METHOD FOR RUNTIME CAPSULE FIRMWARE UPDATE WITH LOW-LATENCY SOFTWARE SMIs

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 243 days.

(21) Appl. No.: 17/157,702

(22) Filed: Jan. 25, 2021

(65) Prior Publication Data

US 2021/0232384 A1 Jul. 29, 2021

Related U.S. Application Data

(60) Provisional application No. 62/965,622, filed on Jan. 24, 2020.

(51) Int. Cl.
| | | |
|---|---|---|
| *G06F 9/44* | (2018.01) | |
| *G06F 8/654* | (2018.01) | |
| *G06F 21/57* | (2013.01) | |
| *G06F 21/74* | (2013.01) | |
| *H04L 9/32* | (2006.01) | |

(52) U.S. Cl.
CPC .......... *G06F 8/654* (2018.02); *G06F 21/572* (2013.01); *G06F 21/74* (2013.01); *H04L 9/3239* (2013.01); *G06F 2221/033* (2013.01); *G06F 2221/2149* (2013.01)

(58) Field of Classification Search
CPC ........................................................ G06F 8/654
USPC ........................................................ 717/168
See application file for complete search history.

(56) References Cited

U.S. PATENT DOCUMENTS

| | | | | |
|---|---|---|---|---|
| 8,214,653 | B1* | 7/2012 | Marr | G06F 8/65 |
| | | | | 713/150 |
| 8,645,717 | B2* | 2/2014 | Flynn | G06F 21/572 |
| | | | | 713/160 |
| 9,116,774 | B2* | 8/2015 | Rajagopalan | G06F 8/654 |
| 10,228,929 | B2* | 3/2019 | El-Moussa | G06F 8/65 |
| 2016/0180095 | A1* | 6/2016 | Sarangdhar | G06F 21/575 |
| | | | | 713/2 |
| 2021/0232981 | A1* | 7/2021 | Sundaresan | H04L 63/08 |

(Continued)

FOREIGN PATENT DOCUMENTS

| | | | |
|---|---|---|---|
| CN | 111176703 A | * | 5/2020 |
| JP | 3863401 B2 | * | 12/2006 |

OTHER PUBLICATIONS

Unified EFI, Inc., Unified Extensible Firmware Interface Specification, Version 2.3.1. pp. 245-255, Apr. 6, 2011.

*Primary Examiner* — Evral E Bodden
(74) *Attorney, Agent, or Firm* — McCarter & English, LLP; John S. Curran

(57) ABSTRACT

Systems and methods for performing flash updates during runtime are discussed. More particularly, the amount of secure memory required to prevent tampering during the update process is limited by storing hashes of logical blocks of the update image in secure memory after initial validation while storing the update image in non-secure RAM or another non-secure memory location. Additionally, disruptions to the computing platform are limited by dividing the logical blocks into smaller progress units to minimize the amount of time spent in the secure operating environment performing the update.

18 Claims, 10 Drawing Sheets

(56) References Cited

U.S. PATENT DOCUMENTS

2023/0140329 A1\* 5/2023 Marino ................ G06Q 30/04
717/172

\* cited by examiner

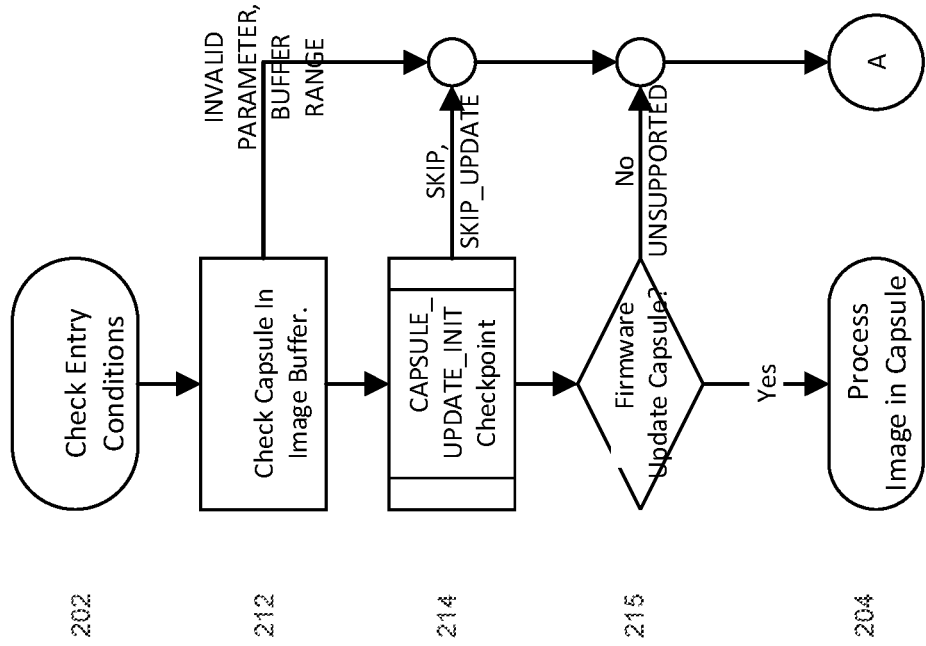

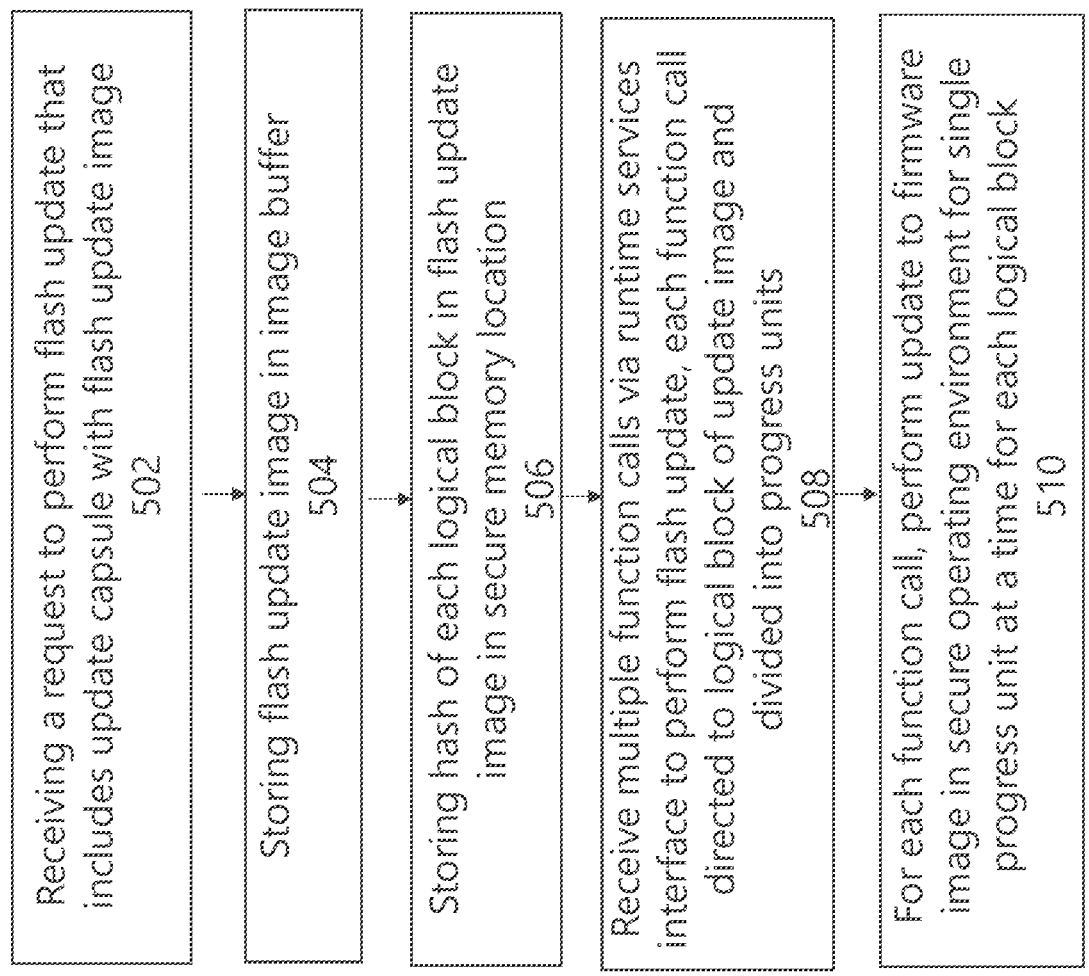

SYSTEM AND METHOD FOR RUNTIME CAPSULE FIRMWARE UPDATE WITH LOW-LATENCY SOFTWARE SMIs

RELATED APPLICATION

This application claims priority to, and the benefit of, U.S. Provisional Patent Application No. 62/965,622, entitled "System and Method for Runtime Capsule Firmware Update with Low-Latency Software SMIs", filed Jan. 24, 2020, the entire content of which is incorporated herein by reference in its entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, Programmable ROM (PROM), Erasable PROM (EPROM), Electrically Erasable PROM (EEPROM), and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy Basic Input/Output System (BIOS).

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

Some computing devices contain one or more processing elements such as Central Processing Units (CPUs) which, when in operation, can read from and also erase and/or write flash ROM. The CPU may have a normal operating mode and a second operating mode called System Management Mode (SMM). When the CPU is in normal operating mode it can access all elements of the computer except certain memory regions exclusively dedicated to SMM. In contrast, when the CPU is operating in SMMit is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by software or firmware. The exact triggers available differ somewhat from among system designs but the result when the platform appropriate trigger is used is that execution in main memory is immediately suspended and execution begins at a specific location in SMM memory.

BRIEF SUMMARY

Embodiments of the present invention provide a method to service UEFI capsule updates using the UEFI runtime services to securely update platform flash devices using one or more firmware function calls implemented in a secure operating environment, such as SMM or TrustZone. The update process is implemented as a series of low-latency firmware function calls that verify and access the flash update image located in untrusted memory. The firmware function calls are sequenced in such a way that even though they operate with interrupts disabled, the latency of these operations is minimized so as to minimize disruption to other drivers and services. This method insures that the flash update image is not tampered with between the first firmware function call and the last while minimizing secure RAM usage.

In one embodiment, a computing platform-implemented method for performing secure flash updates is performed by a computing platform equipped with platform firmware and one or more processors and includes receiving a request to perform a flash update of a firmware image. The request includes an update capsule holding a flash update image that includes firmware code or data or both. The method also includes storing the flash update image in an image buffer and storing a hash of each logical block of the flash update image in a secure memory location that is accessible only when one or more processors on the platform are operating in a secure operating environment. The method further includes receiving multiple function calls via a runtime services interface provided by the computing platform to perform the flash update, each call directed to a logical block of the flash update image, each logical block divided into one or more progress units. Additionally, the method performs, in response to each function call, an update to the firmware image for a single progress unit at a time for each logical block. The update is performed while the one or more processors are operating in the secure operating environment after validating a hash of the logical block of the flash update image with a corresponding stored hash.

In another embodiment, a computing platform equipped with one or more processors includes a non-volatile storage location holding platform firmware that provides a runtime services interface to functions operable in a secure memory environment. The computing platform also includes an image buffer in a non-secure memory location and an operating system configured to execute an application that when executed makes a request to the runtime services interface to perform a flash update of a firmware image. The request includes an update capsule holding a flash update image that includes firmware code or data or both. Upon receiving the request to perform the flash update, the computing platform validates the request, stores the flash update image in the image buffer and stores a hash of each logical block of the flash update image in a secure memory location that is accessible only when one or more processors on the platform are operating in a secure operating environment. The computing platform further receives multiple function calls via the runtime services interface from the application to perform the flash update. Each call is directed to a logical block of the update image with each logical block divided into one or more progress units. The computing platform also performs, in response to each function call, an update to the firmware image for a single progress unit at a time for each logical block. The update is performed while the one or more processors are operating in the secure operating environment after validating a hash of the logical block of the flash update image with a corresponding stored hash.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 2B depicts an exemplary sequence of steps for checking entry conditions during an initial firmware update phase in an exemplary embodiment;

FIG. 5 depicts an exemplary sequence of steps performed by an embodiment to update a flash image at runtime.

DETAILED DESCRIPTION

Figure 1:
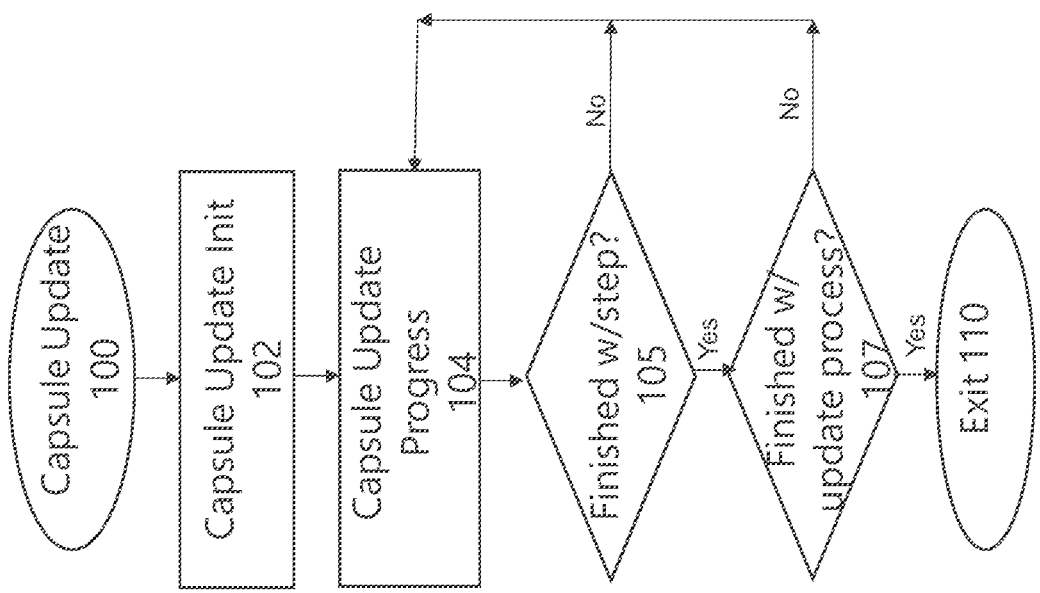
FIG. 1 depicts an overview of an exemplary sequence of steps for providing firmware updates in an exemplary embodiment.

Embodiments of the present invention provide techniques for performing flash updates at runtime. More particularly, embodiments limit the amount of secure memory required to prevent tampering during the update process by storing hashes of logical blocks of the update image in secure memory after initial validation while storing the update image in non-secure RAM or another non-secure memory location. Embodiments further limit disruptions to the computing platform by dividing the logical blocks into smaller progress units to minimize the amount of time spent in the secure operating environment performing the update.

As used herein, the following terms have the following meaning unless a different meaning is clearly apparent from the context in which the term is used:

"Capsule" refers to a formatted binary data structure that starts with a pre-defined header, as defined by the UEFI specification. The format of the data after the header is described by a Globally Unique Identifier (GUID) in the header.

"Capsule Update" refers to the UEFI-defined process of passing information to firmware using a capsule.

"Flash Device Image" refers to the binary data that is placed on one or more platform flash devices. This image contains BIOS firmware code and data. The image may also contain other code and data, such as, but not limited to, Management Engine (ME) code/data, embedded controller code.

Active CPU refers to the CPU where the application issuing the UEFI BIOS runtime service interface commands is running.

System Management Interrupt (SMI) refers to the highest priority interrupt in x86 systems. Detected on instruction boundaries, it places a CPU core into SMM, saves some CPU registers at a pre-defined memory location and begins execution at a pre-defined entry point in SMRAM. It is also referred to as MIMI in the later UEFI specifications.

SMM refers to System Management Mode. It is a CPU execution mode entered upon detection of an SMI. SMM is also referred to as Management Mode (MM) in the later UEFI specifications.

SMRAM refers to System Management RAM, a dedicated memory region that is only visible while a CPU is executing in SMM. SMRAM is also referred to as Management Mode RAM (MMRAM) in the later UEFI specifications.

Software SMI refers to an SMI initiated by software, usually by writing a value a specified I/O port.

Conventionally, a firmware update process updates one or more pieces of the firmware used to operate the devices on a computing platform. The firmware being updated can be the firmware used by the main CPUs, peripheral CPUs or other various motherboard devices, such as audio controllers, Universal Serial Bus (USB) controllers, PHYs, etc. This firmware is typically stored in re-writable flash or EEPROM non-volatile memory. During normal operation, write-access to these non-volatile memory devices is restricted, either to a specific window of time after platform reset or to a specific operating mode of the CPU (such as SMM on x86 CPUs or TrustZone on computing platforms equipped with ARM processors) or to a specific setting of the platform, such as a jumper to a Programming Power Voltage (Vpp) pin on the flash device.

In UEFI systems, the primary delivery vehicle for new images for these flash devices is the "capsule." The capsule contains the new image for the flash device, prefixed by various bits of description information, related binary images (such as flash update drivers or update option information) and signature(s) that can be used by the platform firmware or a delegate device (such as a TPM or FPGA) to verify the integrity of the capsule. An exemplary update provided via a UEFI capsule is described in U.S. patent application Ser. No. 16/270,841, the contents of which are incorporated herein by reference.

A typical conventional firmware update process involves placing the capsule into some form of storage that persists across a computing platform reset and then generating the reset. After reset, the capsule is detected, its contents are verified and then applied to the firmware device that needs updating. The update process can do this because, after reset, but before the OS is loaded into memory and takes control of the platform, most hardware protections for flash devices are disabled. The storage that persists across reset might be DRAM, if the reset does not clear RAM. This is the case, for example with the S3 sleep state as described in the industry specification for the Advanced Configuration and Power Interface (ACPI). The storage can also be an unprotected portion of the same or a different flash device. The storage can also be an NVDIMM, a Solid-State Drive (SSD), a hard disk or a USB key. This firmware update process can take anywhere from several seconds to several minutes, depending on the size of the flash update image, the data transfer speed capabilities of the flash or EEPROM device, and the data transfer speed of the bus through which the flash update image must be communicated.

Unfortunately for some classes of devices, such as medical devices, the system must always be available within a certain amount of time. These platforms optimize their boot time, the time from turning the device on until the time the device is ready to perform a specified task, to make sure the boot time falls within a specific window. As a result, requiring the reset of the computing platform in order to perform the flash update is frequently unacceptable for these types of platforms since the reset process may well push the length of the boot time outside a critical window.

To address this issue, embodiments of the present invention perform a flash update without a reset so that any subsequent resets do not incur a performance penalty during the boot process. Instead the flash update is performed in the background during normal operation (i.e. during runtime) using a capsule that conforms to the standard for UEFI capsules. Since the invention does not reset the system, it means that the flash update process executes while other drivers, daemons and applications are running and therefore embodiments attempt to minimize interference with them while also avoiding increasing boot times. Additionally, embodiments perform the updates so that this flash update process is not susceptible to tampering, including the flash update image itself on disk and in-memory. The flash update process described herein also supports fault-tolerant updates with hardware support so that the platform does not lose the ability to boot if the flash update process is interrupted at any point.

While one possible approach to performing the update without reset would be to copy the entire flash update image into secure RAM (e.g. SMRAM) and then verify that the image is both applicable to the current platform and that the image's integrity can be verified by one of the keys available to the firmware, such an approach is not optimal. Copying the entire flash update image into secure RAM places a burden on the platform design, since a large section of secure RAM must be reserved for the flash update image. Since secure RAM is a limited resource, this approach is not optimal.

Instead of copying the entire flash update image, embodiments divide up the flash update process into separate phases, where one phase (the initial phase) verifies the image integrity and records a hash for the smallest possible update unit (for example, one flash block) in secure RAM. This allows the flash update image to remain in untrusted RAM during the update process and requires only the storage of one hash value per block in secure memory, thereby reducing the storage requirements to $\frac{1}{128}^{th}$ of the original image size (assuming a Secure Hash Algorithm (SHA)-256 hash and a 4 kilobyte (KB) block size).

Embodiments enable the flash update to be performed at runtime, either as a part of the UEFI UpdateCapsule( ) function or directly in response to a request from a requesting application, such as but not limited to a flash update application tool, using a runtime services interface provided by the firmware that includes functions callable by the OS application. Embodiments are designed to run in the background in a manner that does not disrupt operation of running OS drivers, applications and daemons. When firmware update operations suspend normal operation of one or more CPU cores in order to enter SMM and handle an SMI, those cores cannot respond to device interrupts or poll device status. As a result, devices or applications cannot respond within a certain time, as they can miss interrupts or packets or device status or user input, thereby causing the device to be unresponsive or exhibit error conditions. To avoid this problem, embodiments divide up the flash update into steps with each step being an update process using the same mechanism. The steps are then divided into "progress units" that are the smallest amount of work that can be initiated in a single software SMI. Each of these progress units have no time dependencies, thereby allowing the application or firmware application that is calling the firmware update function to insert as much delay as is required to service all OS driver, application or daemon functions. Embodiments also allow the firmware to be tuned to control the acceptable latency/amount of time spent handling the SMI, such as by choosing a different block size. Such tuning may be desirable to control the tradeoff between latency and total flash update time. For example, large block sizes may lead to longer latency but shorter overall flash image update times. Conversely, smaller block sizes may lead to shorter latency but longer overall flash update times. Making firmware function call latency tunable allows it to be adjusted based on actual platform performance characteristics and actual hardware device or user-interface latency requirements. In one embodiment, the firmware function call latency is tunable by a requesting flash update application tool. Further, as explained further below, embodiments allow the flash update image to remain in untrusted memory without loss of security.

In one embodiment, a flash application reads a signed flash update image capsule from a file and calls a runtime services interface provided by the UEFI BIOS that includes functions callable by an OS application to communicate with UEFI firmware. The runtime services interface provides the flash application with the ability to call various runtime services using a software SMI. The flash application may generate a software SMI with function parameters contained in five 32 bit general purpose registers. In some cases the registers may point to buffers that contain additional parameters. The flash application then opens a session to the interface and copies the flash device image into the image buffer.

In one embodiment, to open the session, the flash application calls a function in the runtime services interface that returns the physical addresses and size of the command buffer and image buffers. For flash updates, both must be valid (non-zero). The flash application then calls another function provided by the runtime services interface to check status and security level to make sure the function is supported and that a session is not already open (if there is another session open it must be closed before the flash update can happen). The flash application may further call another function provided by the runtime services interface to lock the interface (except for authentication function calls) and a session token may be returned which is used in all subsequent calls. In one embodiment, the session security level may be set to a lowest level to allow operation of the secure flash update functions that will be called later.

Once the session is open, the flash application copies the flash image into the image buffer and verifies the integrity of the capsule and that the capsule type is supported by the platform by making a call to a function provided by the runtime services interface. Verifying the integrity of the capsule may include checking the format of the capsule and the size of the capsule to make sure it doesn't extend outside the image buffer. A GUID in the capsule header may be checked to see if it matches a GUID supported by the platform. Then the flash application calls a verification function provided by the interface to validate a signature of the signed flash device image using one or more certificates embedded in the booted flash image's flash device. In one embodiment, the flash update parameters may be stored in SMRAM and the version of the update image may checked to see if it is greater than or equal to the version of the booted flash image. The verification function may also record any flash update functions in an style file embedded in the capsule data. For example, these options may include skipping parts of the flash update image and options to preserve specific types of data, such as UEFI variables. In an embodiment, a SHA-256 hash of each block in the flash update image is stored in an array in SMRAM for later use during the update process. In one embodiment a flash update checkpoint may be called. For example, for ping/pong schemes, the checkpoint handler selects another flash device as the write-to-flash device. For golden/current schemes, the checkpoint handler may mark the golden image as preferred after the next reset. In an embodiment, the verification function saves the current offset and ending offset, the flash layout map and sets an internal flag indicating that the flash update process has started. This last step may be required for security purposes because the flash update process takes place over multiple calls to the runtime services update function. As noted above, in order to protect against tampering of the flash update image in the image buffer, the hash of each flashable block of the capsule data is recorded in SMRAM. The size of the flashable block is determined by the block architecture of the flash device but is typically 4 KB or 64 KB. This allows the flash update function being called to verify that the portion of the image buffer (in non-secure memory) being used to update the flash image has not been tampered with between calls. Once the flash device image has been verified, the flash update application repeatedly calls the flash update functions provided by the runtime services interface until the entire flash device image has been updated and then optionally resets the system. The process of performing the update is described in further detail below.

In one embodiment, the flash application runs the basic process of updating the flash image. The main loop breaks down the flash update process into individual logical blocks. The flash application repeatedly invokes an update function provided by the runtime services interface until the step has completed. Then it increments to the next logical block until there are no more logical blocks. Multiple invocations to the update function may be required to process a single block. When that occurs, rather than wait inside of SMM, the processing of the block returns to the flash application with a flag set that indicates the logical block has not finished updating. For example: in the processing of a single flash block, there may be a first step to erase the flash block and then one or more steps to write all of the contents of that flash block. In another example: when updating Management Engine (ME) firmware, the ME firmware handles the updates. In an embodiment, when the ME firmware is handling the updates, one step initiates the update and the next steps poll for the update completion. In an embodiment, once a logical block has been updated, the flash application increments the flash position by the size of the logical block processed.

It should be appreciated that during the update process, security errors may happen for a variety of reasons and bring the update process to a halt. Examples include:

1. Situations where the parameters are incorrect, including session tokens.

2. Attempts to call the update function without first passing the image to BIOS or after the flash process has been finalized.

3. Situations where the hash of the logical block does not match the hash recorded during the verify step (above).

4. Situations where a microcontroller (such as an ME, or an embedded controller EC or parallel slave port (PSP) responsible for a portion of the flash update process reported a security error.

5. Situations where an offset or size was passed in that does not match one of the logical blocks or matches a previous logical block.

In one embodiment, each update is divided into steps and all steps must be completed. Each step is an update process that uses the same mechanism. Each step is further divided into progress units with each unit being the smallest amount of work that can be initiated in a single software SMI so that the time spent in SMM handling the SMI is reduced as much as possible to reduce latency. The flash update is made up of logical blocks. Each logical block may either be under control of the BIOS or under the control of another controller (like an ME, an EC, etc.) Each logical block can be discovered in the flash map maintained by the BIOS. If the logical block is under the control of another controller, then the flashing process is controlled by a checkpoint handler.

In an embodiment, if the logical block is under control of the BIOS, then its programming is broken down into the erase cycles and write cycles required to update the flash device. Updating the flash device is broken into three phases: initialization, erase and then write. During initialization, the update region is copied into an SMRAM buffer and its hash is compared against a previously stored corresponding SHA-256 hash (stored during the verify phase discussed above) and then the process transitions to the erase phase on the next call. During the erase phase, one or more physical flash blocks are erased. When all blocks have been erased, the process transitions to the write phase. During the write phase, one or more bytes of the physical flash blocks are written from the internal copy. When all bytes have been written, then the process transitions out of the write phase. This signals the flash application to go to the next logical block (for example by returning bit 0 of the CL register set to 0—otherwise it is set to 1).

FIG. 1 depicts an overview of an exemplary sequence of steps for processing firmware updates in an exemplary embodiment. The capsule update sequence 100 is divided into two phases. The first initial phase (Init) (step 102) validates the capsule, processes the image, processes the options and counts the steps. The second phase, the progress phase (step 104), performs each step by performing one update progress unit at a time. Periodically, a check is performed to see if all of the progress units in the step are finished (step 105), and if not the process continues with the same step. If the step is finished, a check is performed to see if the entire update process is finished (step 107) or if another step needs to be completed. If the update process is finished, the sequence ends (step 110). Each of these steps in the update sequence is described in further detail below.

Figure 2A:
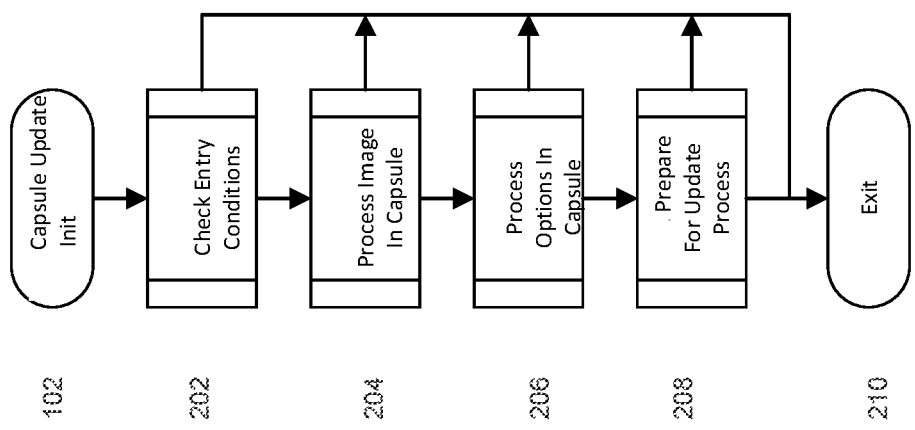
FIG. 2A depicts an overview of an exemplary sequence of steps for an initial firmware update phase in an exemplary embodiment.

FIG. 2A depicts an overview of an exemplary sequence of steps for the initial firmware update phase in an exemplary embodiment. The initial update phase (step 102) begins by checking entry conditions and checking for non-firmware update capsules (step 202). The image in the capsule is then found and processed to validate it and the step map is reported (step 204). The options in the capsule are identified and processed to update the step map (step 206). The sequence then prepares for the update process (step 206). Each of these steps is discussed in further detail below in FIGS. 2B-2E.

FIG. 2B depicts an exemplary sequence of steps for checking entry conditions during an initial firmware update phase in an exemplary embodiment. The sequence (for step 202) begins by checking the received capsule in the image buffer (step 212). The entry conditions check includes making sure that the update function is supported and determining whether the capsule header is in the image buffer and whether the entire capsule image is in the buffer. If the function is not supported an unsupported error message may be returned. If the buffer checks fail a buffer range error may be returned. The format of the capsule is also checked which includes checking the capsule header format and the FMP capsule header format. If the formatting is incorrect an invalid parameter error may be returned. Assuming all of the checks are passed an initial phase checkpoint is triggered assuming it is enabled (if not an error may be returned and the service exits) (step 213). If the capsule is not a firmware update capsule (step 215) an unsupported message may be returned. Otherwise, the sequence continues to process the image in the capsule (step 204).

Figure 2C:
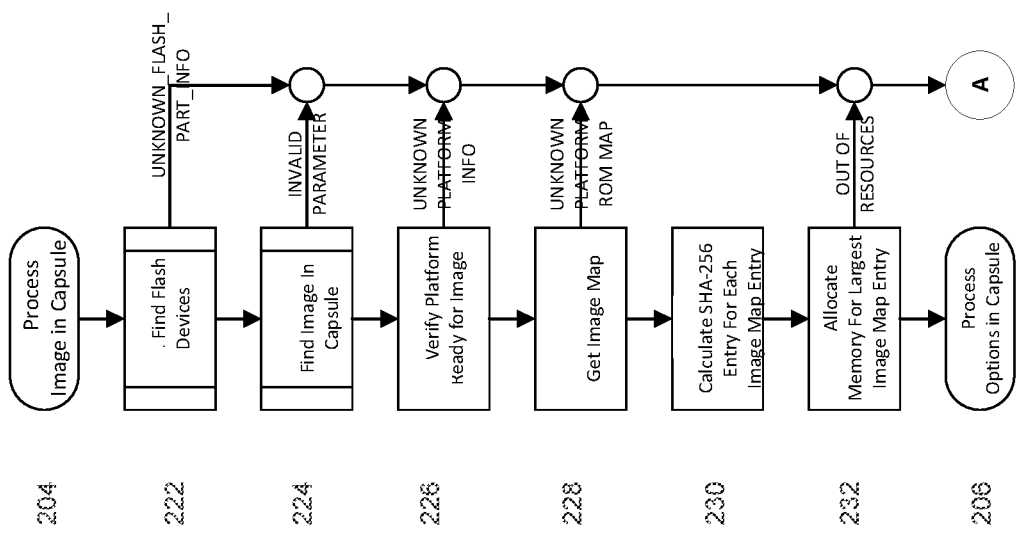
FIG. 2C depicts an exemplary sequence of steps for processing an image in a capsule during an initial firmware update phase in an exemplary embodiment.

FIG. 2C depicts an exemplary sequence of steps for processing an image in a capsule (step 204) during an initial firmware update phase in an exemplary embodiment. The sequence begins by finding the flash devices in the system (step 222) and using this information to calculate a pointer to the current image (the one the BIOS is running out of) and a target image (the one that will be updated by this process). As a default option, these may be the same. The image in the capsule is then found and verified using a stored certificate (step 224). Next verification is performed that the image is ready for the platform and the platform is ready for the image (step 226). An image map is then created which may be an array that describes the content of each region in the flash device and the access method needed to update it. The image map may initially be populated with the contents of the flash device map (step 228). In an embodiment, a check may be made of other components such as the chipset and super I/O of other regions with a unique content type and a unique access method. A library class may provide functions for creating individual map entries and inserting them into the existing image map. A buffer is allocated to hold a SHA-256 hash per image step entry and the SHA-256 hash is calculated for each image step and recorded in the first array (step 230). A buffer may then be allocated to hold the largest of the image map regions (step 232) and the sequence proceeds to processing the options in the capsule (step 206).

Figure 2D:
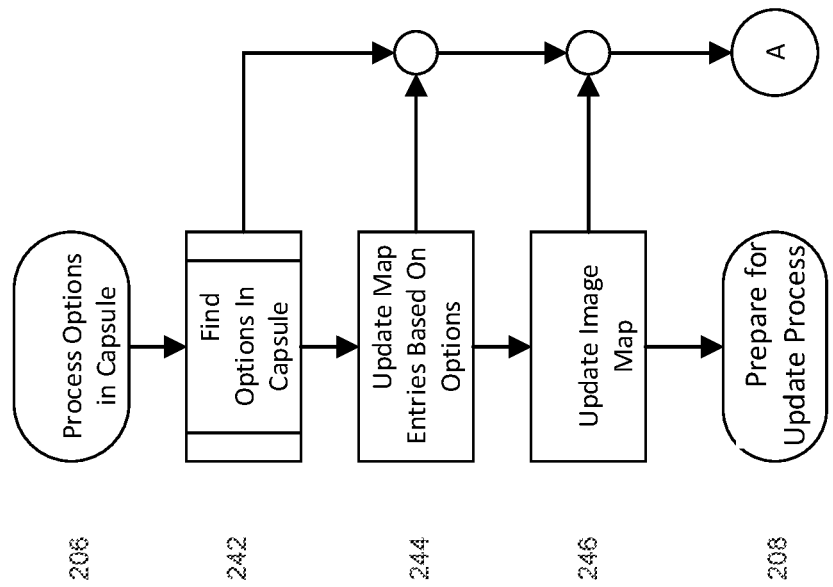
FIG. 2D depicts an exemplary sequence of steps for processing options during an initial firmware update phase in an exemplary embodiment.

FIG. 2D depicts an exemplary sequence of steps for processing capsule options (step 206) during an initial firmware update phase in an exemplary embodiment. The sequence begins by finding the options in the capsule (step 242). The update options may be passed from a flash application or embedded in the image, depending on security level. If options were passed from a flash application they are processed, otherwise the options embedded in the image are discovered. Each update option may include a keyword and value. In one embodiment, if no update options are specified then a default may be to flash the entire image while preserving UEFI variables. After the options are found, the image map entries are updated based on the options (step 244) and then the image map is updated (step 246). The sequence then proceeds to prepare for update process step (step 208).

Figure 2E:
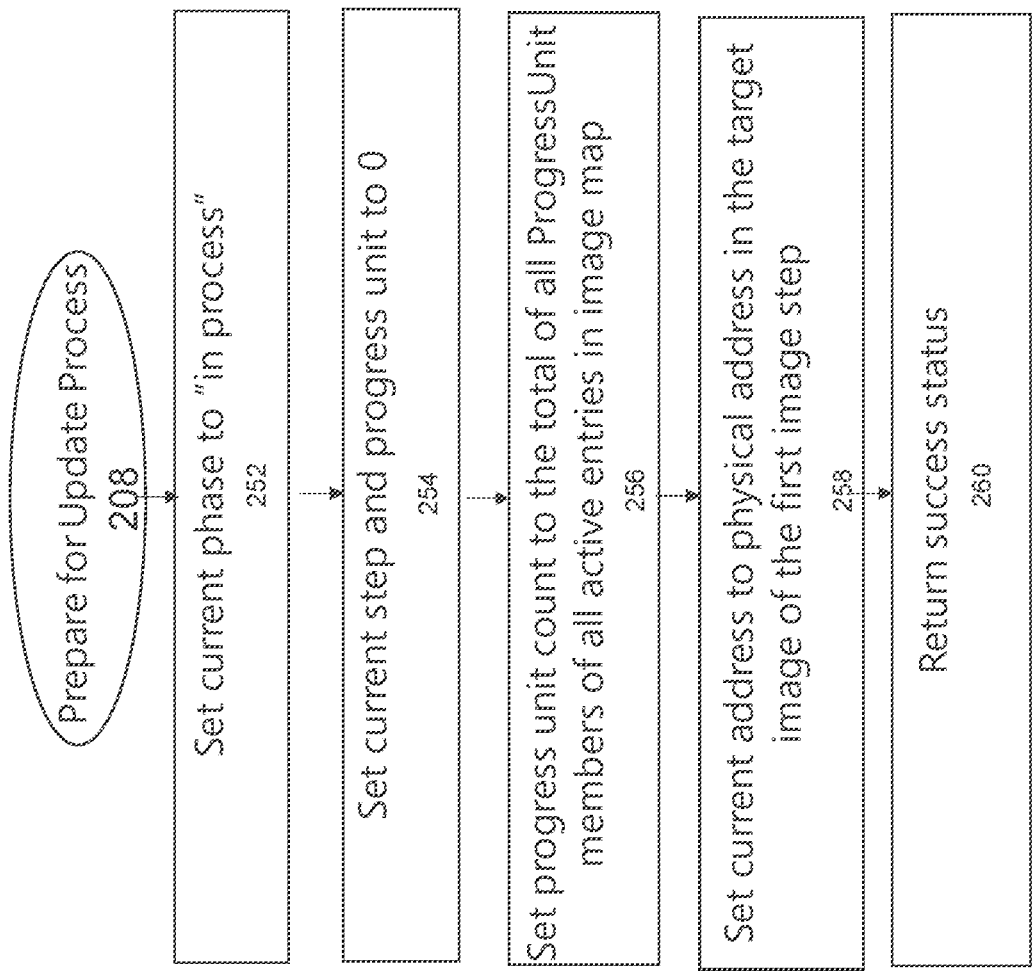
FIG. 2E depicts an exemplary sequence of steps for preparing for the update process during an initial firmware update phase in an exemplary embodiment.

FIG. 2E depicts an exemplary sequence of steps for preparing for the update process (step 208) during an initial firmware update phase in an exemplary embodiment. The sequence begins by setting the current phase to "in process" (step 252). The current step and progress unit are set to zero (step 254) and the progress unit count is set to the total of all progress unit members of all active entries in the image map (step 256). The current address is set to the physical address in the target image of the first image step (step 258) and a success status is returned.

Figure 3A:
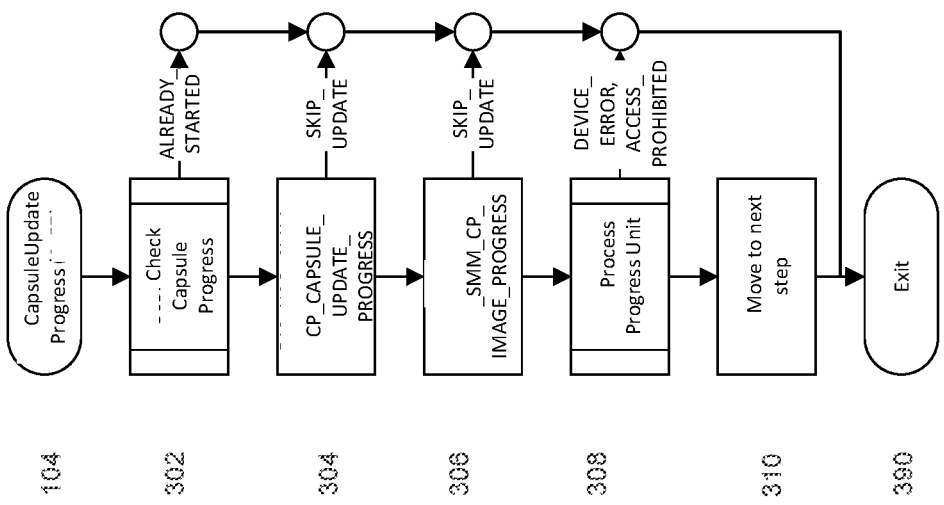
FIG. 3A depicts an overview of an exemplary sequence of steps for a progress phase of the firmware update in an exemplary embodiment.

Following the completion of the initial phase (step 102) of the firmware update process, the update progress phase (step 104) is performed in which the update is applied. FIG. 3A depicts an overview of an exemplary sequence of steps for a progress phase (step 104) of the firmware update in an exemplary embodiment. The sequence begins by checking that there is a capsule update in progress (step 302) following the completion of the initial phase (step 102). A check may also be performed to allow progress for capsule types not supported by the kernel (step 304). Next the current firmware update step is allowed to progress (step 306). The flash block update is performed for the current progress unit (step 308). If the flash process completes the current unit of progress then the function returns a "progress" indicator to inform the flash application that it has completed. The next call from the flash application continues with the next unit of progress. If the flash process will require a lot of time, then the function returns a "wait" indicator to inform the flash application that there is an ongoing update process and that there has been no progress (i.e. the step hasn't completed yet). The next call continues the update process with the same unit of progress. The progress unit count is adjusted upon completion. If there are no more progress units in the step, the sequence moves to the next step (and its progress units) (step 310) and returns a progress message. If there are no more steps, then a finished message is returned.

Figure 3B:
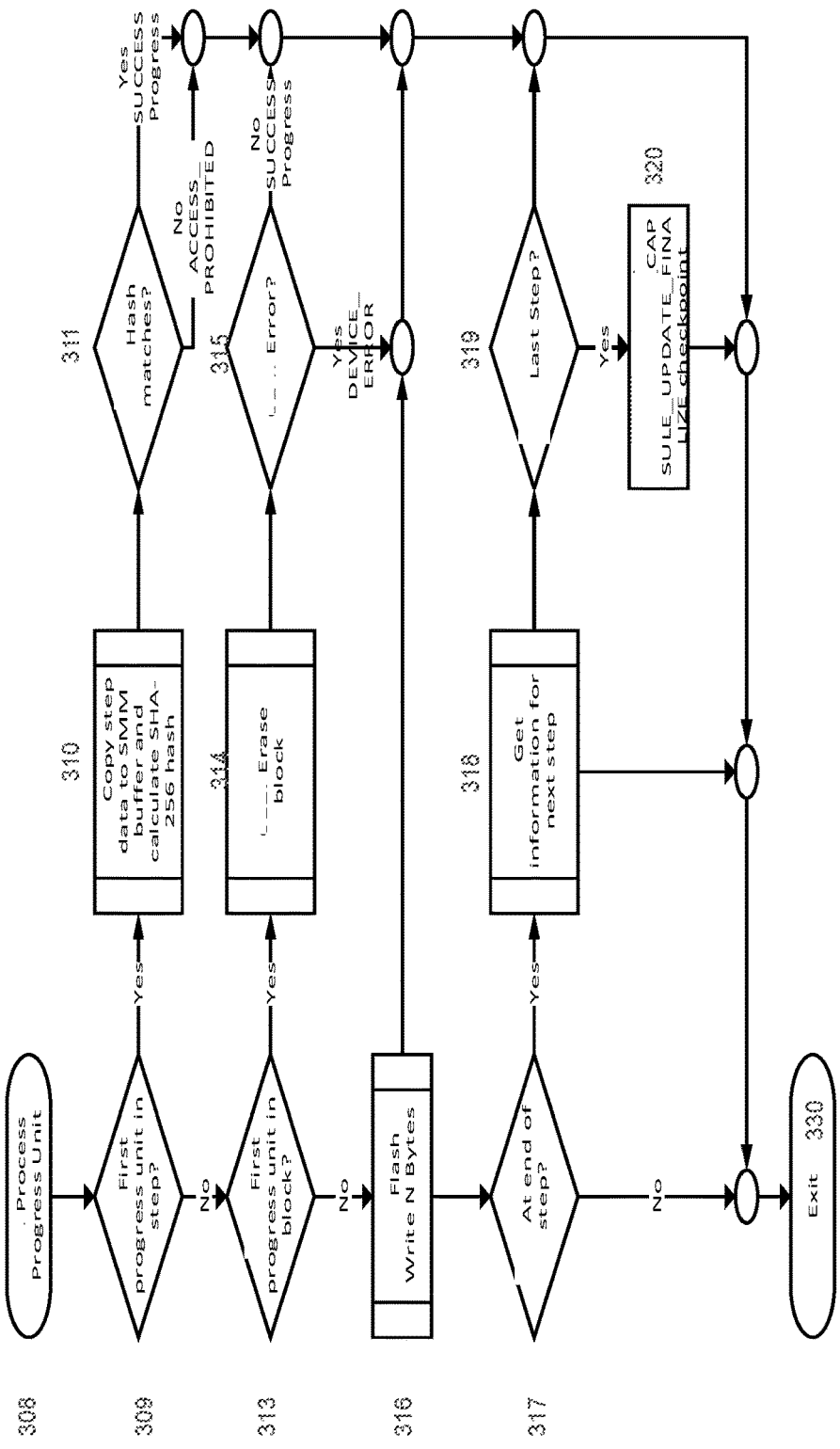
FIG. 3B depicts an exemplary sequence of steps for performing a firmware update step by processing a progress unit in an exemplary embodiment.

FIG. 3B depicts an exemplary sequence of steps for performing a firmware update step by processing a progress unit (step 308) in an exemplary embodiment. The firmware update step contains N flash blocks and each flash block contains M update units. There are N*(M+1) progress units: 1 erase operation per block and M write operations per block. If the progress unit is the first progress unit in a step (step 309), step data is copied from the image buffer and a new SHA-256 hash is calculated (step 310). If the new hash does not match the hash previously stored in secure RAM (step 311), the sequence exits w/error. If the progress unit is the first progress unit in a flash block (step 313), the block is erased (step 314). If the progress unit is not the first progress unit in a flash block (step 313), M bytes are written for the progress unit (step 316). If the step is completed (step 317), the update process retrieves information for the next step (step 318) and if the update process is at the last step (step 319), triggers a capsule update finalize checkpoint (step 320) and exits (step 330). A finalize checkpoint allows the hardware to prefer the new flash image after the next reset. In ping/pong schemes, the finalize checkpoint handler selects the other flash image as the preferred image after the next reset. In golden/current schemes, the checkpoint handler enables the booted flash image as the write-to image. After completion of the last step, the flash update application calls a function in the runtime services interface to close the session. After the session is closed, the flash application either exits or resets the system.

In some embodiments, each capsule update step is an update process that uses the same mechanism (for example, BIOS SPI block update, ME image, EC image, etc.). As discussed above, steps are calculated during the initial phase of the two phase capsule update process. Each step may contain data for:
  Content Type: contents of the update (for example, Physical External Interface (PEI)FV);
  Method Type: a GUID that specifies how to update the data;
  Method Target: indicating how to position the update for the update method;
  Capsule Image Offset: an offset in the capsule image where the update starts;
  Capsule Image Size: indicating a number of bytes in the capsule image in this step;
  Progress Unit Count: indicating a number of progress units to finish this step.
  Status: indicating whether this step should be processed or ignored.

In one embodiment, an example capsule update step may include the following information:
  Content Type—PEI Firmware Volume;
  Method Type—BIOS Serial Peripheral Interface (SPI);
  Method Target—Physical Address;
  Capsule Image Offset—0;
  Capsule Image Size—N bytes;
  Capsule Image Block Size—M bytes;
  Progress Unit Count—1 per 0 bytes+1 per block;
  Status—Processed.

In one embodiment, an exemplary capsule build process may be updated by updating the build process to build the entire flash device image as a default output of the build process. In an embodiment, the capsule build process may be updated to get per-capsule-type verification certificates in FactoryDefaultConfig.ini and to add libraries to support getting certificates and doing capsule image verification using certificates.

In one embodiment, a UEFI runtime services update may include a new SMM interface function to determine whether a capsule type is supported. The runtime services update may use specified functions in the SMM interface to support capsules that support runtime processing and update BDS to support capsules that support reset processing.

In some embodiments, an OS application may deliver signed capsules to update some or all BIOS code/data. The application can use UpdateCapsule( ), ESP delivery or SMM runtime service interface functions to deliver the update. The application may minimize the amount of time that interrupts are disabled and other OS applications and drivers cannot execute but may not be allowed to control which parts of the BIOS image are updated. Options about which parts are flashed may be a part of the capsule and are signed with the capsule and different capsules may be created for different types of updates. In some embodiments, the application is not allowed to modify the capsule image in memory. In an embodiment, the OS application cannot use any SMM function that reads or writes the flash image if the function does not also verify the entire portion of the flash image used during that function call.

While some embodiments may focus on the update process for system SPI flash devices, other types of system updates can be performed, such as for EEPROMs, flash devices on Low Pin Count (LPC) buses, the enhanced serial peripheral interface (eSPI) bus or some other storage type. Further, while embodiments have been discussed with respect to system firmware, the described approaches may also be applied to other motherboard-managed devices, such as, but not limited to, the Intel™ Management Engine firmware, on-board Gigabit Ethernet (GbE) firmware, sensor firmware, Field Programmable Gate Array (FPGA) firmware, etc.

Embodiments enable secure RAM usage to be reduced, in one embodiment by 99%. In an embodiment, latency of a flash update is reduced to the longest of either one flash erase command or one flash byte write command or the calculation of a hash for the image. In some embodiments, for erase, the minimum absolute time is the time required to send the erase sector command and a minimum average time which is the time required between two erase sector commands or between an erase sector command and a write byte command.

Figure 4:
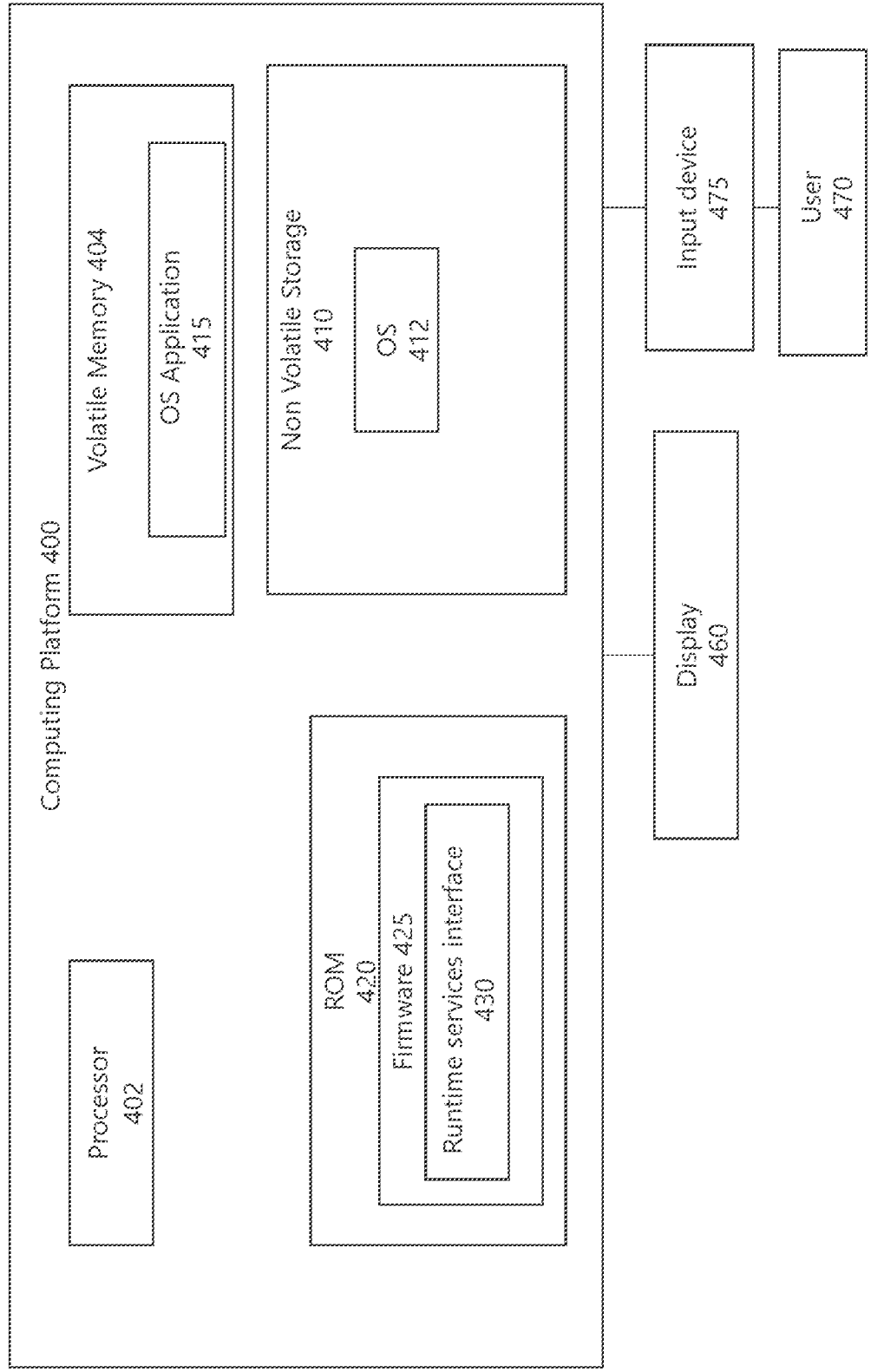
FIG. 4 depicts an exemplary computing platform suitable for performing embodiments of the present invention.

FIG. 4 depicts an exemplary computing platform 400 suitable for performing embodiments of the present invention. A computing platform 400 includes one or more processors 402 such as, but not limited to a central processing unit (CPU), and volatile memory such as random access memory (RAM) 404. The computing platform may be, but is not limited to, a server, desktop computer, laptop computer, mobile computing device, smartphone, medical device, etc. equipped with one or more flash devices. The computing platform 400 may also include non-volatile storage 410 such as a hard drive holding an operating system (OS) 412 and Read Only Memory (ROM) 420 holding platform firmware 425. Firmware 425 may include runtime services interface 430 including functions for updating platform firmware. ROM 420 may be flash memory and may be provided in the form of one or more Non-Volatile Dual-Inline Memory Modules (NVDIMMs) (not shown) that may each include Flash memory, DRAM and a memory controller. Firmware 425 may be executed during a boot sequence for the computing platform 400 as well as at other times (i.e.; during runtime). For example, firmware 425 may load OS 412 into volatile memory 404 for execution during the boot sequence and may update firmware data on the computing platform following a platform reset or during runtime as described herein in response to a request from OS Application 415 operating in volatile memory during runtime. A user 470 may utilize an input device 475 such as a keyboard or touch screen to interact with computing platform 400. Display 460 may be integrated into computing platform 400 or may be a separate display surface.

FIG. 5 depicts an exemplary sequence of steps performed by an embodiment to update a flash image at runtime. The sequence begins by a computing platform receiving a request from a requesting application at runtime to perform a flash update that includes an update capsule with a flash update image (step 502). Some or all of the flash update image may be stored in an image buffer in non-secure RAM or other memory location (step 504) and a hash of each logical block in the flash update image is stored in a secure memory location only accessible from a secure operating environment (step 506). A runtime services interface provided by the platform firmware then receives multiple function calls from a requesting flash application. Each function call is directed to a logical block of the update image and divided into progress units (step 508). For each function call an update is performed to the firmware image for a single progress unit at a time for each logical block. The updates are performed in a secure operating environment such as, but not limited to SMM or TrustZone (step 510).

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A non-transitory medium holding executable instructions for performing secure flash updates, the instructions when executed on at least one computing platform equipped with platform firmware and at least one processor, causing the platform to:
   receive a request to perform a flash update of a firmware image, the request including an update capsule holding a flash update image that includes firmware code or data or both;
   store the flash update image in an image buffer;
   verify the flash update image, the verifying including:
      verifying a signature of the flash update image using a previously stored certificate, and
      storing a separate hash of each logical block of the flash update image in a secure memory location that is accessible only when one or more processors on the platform are operating in a secure operating environment;
   receive a plurality of function calls via a runtime services interface provided by the platform firmware to perform the flash update, each call directed to a single logical block of the flash update image, each logical block divided into one or more progress units, at least one of the logical blocks including two or more progress units; and
   perform, in response to each function call, an update to the firmware image for a single progress unit at a time for each logical block, the update performed while the one or more processors are operating in the secure operating environment after validating a hash of the logical block of the flash update image with a corresponding stored hash,
   wherein a latency of the plurality of firmware function calls is tunable.

2. The medium of claim 1 wherein the one or more processors exit the secure operating environment and re-enter the secure operating environment between performing updates for different progress units.

3. The medium of claim 1 wherein the secure operating environment is System Management Mode (SMM) or TrustZone.

4. The medium of claim 1, wherein the instructions when executed cause the at least one computing platform to:
   verify a signature of the flash update image with a function provided by the runtime services interface.

5. The medium of claim 1 wherein the image buffer is located in non-secure memory.

6. The medium of claim 1 wherein the latency is tunable by adjusting block size of the flash update image.

7. The medium of claim 1 wherein a secure flash update is performed for one of a system serial peripheral interface (SPI) device, an electrically erasable programmable read only memory (EEPROM), a flash device on a low pin count (LPC) bus, or an enhanced serial peripheral interface (eSPI) bus.

8. The medium of claim 1 wherein the flash update image is an update for system firmware, Management Engine firmware, on-board gigabit Ethernet (GbE) firmware, sensor firmware or Field Programmable Gate Array (FPGA) firmware.

9. A computing platform-implemented method for performing secure flash updates, the computing platform equipped with platform firmware and at least one processor, the method comprising:
   receiving with the computing platform a request to perform a flash update of a firmware image, the request including an update capsule holding a flash update image that includes firmware code or data or both;
   storing the flash update image in an image buffer;
   verifying the flash update image, the verifying including:
      verifying a signature of the flash update image using a previously stored certificate, and
      storing a separate hash of each logical block of the flash update image in a secure memory location that is accessible only when one or more processors on the platform are operating in a secure operating environment;

receiving a plurality of function calls via a runtime services interface provided by the platform firmware to perform the flash update, each call directed to a single logical block of the flash update image, each logical block divided into one or more progress units, at least one of the logical blocks including two or more progress units; and performing, in response to each function call, an update to the firmware image for a single progress unit at a time for each logical block, the update performed while the one or more processors are operating in the secure operating environment after validating a hash of the logical block of the flash update image with a corresponding stored hash, wherein a latency of the plurality of firmware function calls is tunable.

10. The method of claim 9 wherein the one or more processors exit the secure operating environment and re-enter the secure operating environment between performing updates for different progress units.

11. The method of claim 9 wherein the secure operating environment is System Management Mode (SMM) or TrustZone.

12. The method of claim 9, further comprising:
verifying a signature of the flash update image with a function provided by the runtime services interface.

13. The method of claim 9 wherein the image buffer is located in non-secure memory.

14. The method of claim 10 wherein the latency is tunable by adjusting block size.

15. The method of claim 9 wherein a secure flash update is performed for one of a system serial peripheral interface (SPI) device, an electrically erasable programmable read only memory (EEPROM), a flash device on a low pin count (LPC) bus, or an enhanced serial peripheral interface (eSPI) bus.

16. The method of claim 9 wherein the flash update image is an update for system firmware, Management Engine firmware, on-board gigabit Ethernet (GbE) firmware, sensor firmware or Field Programmable Gate Array (FPGA) firmware.

17. A computing platform equipped with one or more processors, comprising:

a non-volatile storage location holding platform firmware that provides a runtime services interface to functions operable in a secure memory environment;

an image buffer in a non-secure memory location;

an operating system configured to execute an application that when executed makes a request to the runtime services interface to perform a flash update of a firmware image, the request including an update capsule holding a flash update image that includes firmware code or data or both;

wherein, upon receiving the request to perform the flash update, the computing platform:
stores the flash update image in the image buffer;
verifies the flash update image, the verifying including:
verifying a signature of the flash update image using a previously stored certificate, and
storing a separate hash of each logical block of the flash update image in a secure memory location that is accessible only when one or more processors on the platform are operating in a secure operating environment;
receives a plurality of function calls via the runtime services interface from the application to perform the flash update, each call directed to a single logical block of the flash update image, each logical block divided into one or more progress units, at least one of the logical blocks including two or more progress units; and
performs, in response to each function call, an update to the firmware image for a single progress unit at a time for each logical block, the update performed while the one or more processors are operating in the secure operating environment after validating a hash of the logical block of the flash update image with a corresponding stored hash,
wherein a latency of the plurality of firmware function calls is tunable.

18. The computing platform of claim 17 wherein the one or more processors exit the secure operating environment and re-enter the secure operating environment between performing updates for different progress units.

* * * * *